(12) United States Patent
Schneiderman et al.

(10) Patent No.: US 9,438,947 B2
(45) Date of Patent: Sep. 6, 2016

(54) CONTENT ANNOTATION TOOL

(71) Applicant: Google Inc., Mountain View, CA (US)

(72) Inventors: Henry Will Schneiderman, Pittsburgh, PA (US); Michael Andrew Sipe, Pittsburgh, PA (US); Marco Paglia, San Francisco, CA (US); Mikkel Crone Köser, Vanløse (DK)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/874,541

(22) Filed: May 1, 2013

(65) Prior Publication Data
US 2014/0331264 A1 Nov. 6, 2014

(51) Int. Cl.
H04N 7/173 (2011.01)
H04N 21/278 (2011.01)
H04N 21/4722 (2011.01)
G06F 17/30 (2006.01)

(52) U.S. Cl.
CPC ...... *H04N 21/278* (2013.01); *G06F 17/30855* (2013.01); *H04N 21/4722* (2013.01)

(58) Field of Classification Search
USPC ........................................ 725/40, 51, 60, 92
See application file for complete search history.

(56) References Cited

U.S. PATENT DOCUMENTS

| | | | |
|---|---|---|---|
| 5,596,705 A | 1/1997 | Reimer et al. | |
| 6,721,954 B1 | 4/2004 | Nickum | |
| 8,046,691 B2 | 10/2011 | Sankar et al. | |
| 8,246,454 B2 | 8/2012 | Zalewski | |
| 2002/0042920 A1* | 4/2002 | Thomas | G06F 3/0481 725/87 |
| 2002/0112249 A1 | 8/2002 | Hendricks et al. | |
| 2003/0126622 A1 | 7/2003 | Cohen et al. | |
| 2004/0226043 A1 | 11/2004 | Mettu et al. | |
| 2005/0132420 A1 | 6/2005 | Howard et al. | |
| 2007/0005795 A1 | 1/2007 | Gonzalez | |
| 2007/0061862 A1 | 3/2007 | Berger et al. | |
| 2008/0154908 A1 | 6/2008 | Datar et al. | |
| 2008/0244676 A1 | 10/2008 | DaCosta | |
| 2008/0294694 A1 | 11/2008 | Maghfourian et al. | |
| 2009/0027337 A1 | 1/2009 | Hildreth | |
| 2009/0164938 A1 | 6/2009 | Wang | |

(Continued)

OTHER PUBLICATIONS

Bischoff, Daniel R. "Kung Fu Live Review", Game Revolution, [online], Dec. 10, 2010, [retrieved on Aug. 27, 2014]. Retrieved from the Internet< URL: http://www.gamerevolution.com/review/kung-fu-live >.

(Continued)

*Primary Examiner* — Pankaj Kumar
*Assistant Examiner* — Charles N Hicks
(74) *Attorney, Agent, or Firm* — Morris & Kamlay LLP

(57) ABSTRACT

A content annotation tool is disclosed. In a configuration, a portion of a movie may be obtained from a database. Entities, such as an actor, background music, text, etc. may be automatically identified in the movie. A user, such as a content producer, may associate and/or provide supplemental content for an identified entity to the database. A selection of one or more automatically identified entities may be received. A database entry may be generated that links the identified entity with the supplemental content. The selected automatically identified one or more entities and/or supplemental content associated therewith may be presented to an end user.

23 Claims, 5 Drawing Sheets

(56) References Cited

U.S. PATENT DOCUMENTS

| | | |
|---|---|---|
| 2010/0273553 A1 | 10/2010 | Zalewski |
| 2011/0063415 A1 | 3/2011 | Gefen et al. |
| 2011/0093875 A1 | 4/2011 | Simmons et al. |
| 2011/0103763 A1 | 5/2011 | Tse et al. |
| 2011/0246471 A1 | 10/2011 | Rakib |
| 2011/0264527 A1 | 10/2011 | Fitzpatrick et al. |
| 2012/0167146 A1 | 6/2012 | Incorvia |
| 2012/0236201 A1 | 9/2012 | Larsen et al. |
| 2012/0258776 A1 | 10/2012 | Lord et al. |
| 2013/0198642 A1* | 8/2013 | Carney ............... G06F 3/0484 715/738 |
| 2013/0205343 A1* | 8/2013 | Kirby ............................ 725/51 |

OTHER PUBLICATIONS

International Search Report and Written Opinion in PCT/US2014/035785 mailed Oct. 9, 2014.

Makita, K. et al. "Shared Database of Annotation Information for Wearable Augmented Reality System" SPIE Proceedings of Stereoscopic Displays and Virtual Reality Systems XI, San Jose CA USA vol. 5291, Jun. 24, 2004, pp. 464-471.

Metacritic "Kung-Fu Live for Playstation 3 Reviews, Rating, Credits and More", [online], Apr. 30, 2012, [retrieved on Aug. 27, 2014]. Retrieved from the Internet< URL: http://www.metacritic.com/playstation-3/kung-fu-live >.

* cited by examiner

CONTENT ANNOTATION TOOL

BACKGROUND

Modern movie or video browsing may allow a user to interact with content displayed. For example, a DVD may have selectable icons that are displayed and, when selected, the icons may cue display of director commentary, for example. Online video sharing websites may allow users to insert comments that may be tagged to a particular time reference of the video. Video content creators may also insert URLs into videos that may link to content external to the website hosting the video. However, the tools to generate interactive content are limited. For example, in some instances, a content creator may be required manually indicate an active or clickable portion of the screen. The active portion of the screen may not coincide with the object of interest spatially and/or temporally.

BRIEF SUMMARY

According to an implementation of the disclosed subject matter, a portion of a first movie may be obtained. An entity within the portion of the movie may be automatically identified. Supplemental content may be received from a first user about the identified entity within the first movie. A database entry may be stored that links the identified entity within the portion of the first movie and the supplemental content about the identified entity. A portion of a second movie may be provided to a second user. The portion of the second movie may include the identified entity. A request may be received from the second user based upon the portion of the second movie and the identified entity. Responsive to the request, the supplemental content may be provided to the second user.

In an implementation, a movie may be provided. A query from a user may be received. The query may be received by an input method during playback of the movie. A location reference for the query may be determined. The location reference may identify an entity in the movie. Supplemental content about the identified entity may be retrieved from a database. The database may include one or more automatically identified entities for one or more movies and supplemental content. A response to the query may be provided to the user. The response may include supplemental content.

In an implementation, a query may be received by a database. The database may include one or more automatically identified entities from one or more movies and supplemental content. A response may be generated that includes supplemental content and is based on at least one of a user history and a user location. The response may be sent to a device.

In an implementation, supplemental content may be received. The supplemental content may be stored. Content may be obtained. An entity in the content may be automatically identified. A portion of the supplemental content may be retrieved based on the entity. A database entry that links the identified entity with a portion of the supplemental content while the entity is present in the content may be stored. A portion of the content that includes the identified entity may be provided to a user. A request may be received from the user based upon the portion of the movie and the identified entity. Responsive to the request, the supplemental content may be provided to the user.

In an implementation, a portion of a first movie may be obtained. One or more entities within the portion of the movie may be automatically identified using a technique such as face recognition, audio recognition, voice recognition, text recognition, or the like. Supplemental content may be received from a first user about one or more of the automatically identified entities within the first portion of the movie. The supplemental content may include a selection of one or more of the automatically identified entities, and/or additional content provided by a user. A database entry may be stored and/or generated that links the identified entity within the portion of the first movie and the supplemental content about the identified entity. Supplemental content may be received and/or associated with the selected one or more entities. In some instances, the supplemental content and/or automatically identified entities may be associated with a time reference.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims. Implementations disclosed herein may allow content creators to submit supplemental content that may be provided to an end user. The supplemental content may be interactive with a user's input actions (e.g., pausing a movie, selecting content in a video frame, etc.), and may be updated and/or provided to more than one video. These and other features may allow for generation of interactive media and content based upon entities present within the media.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
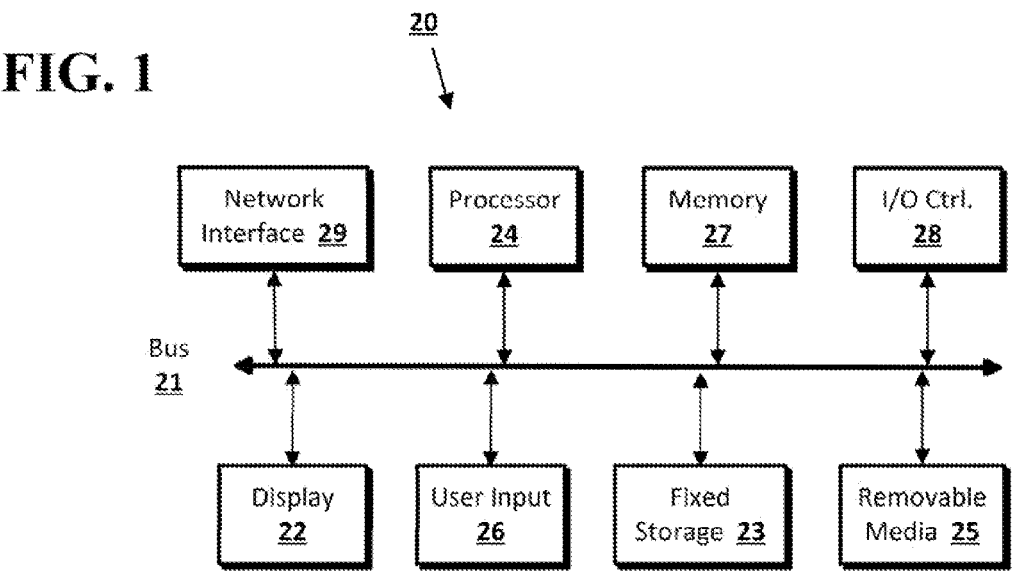
FIG. 1 shows a computer according to an implementation of the disclosed subject matter.

According to the present disclosure, a tool is provided that allows anyone to create an interactive video, audio, or multimedia sequence that may extend beyond consumption of the content itself. For example, the tool may be used to identify actors in a movie using facial recognition and link or attach supplemental information about each actor identified. For example, the supplemental information may be contained in a database, and the tool may create a link between one or more actors' faces and the location of a subset or all of the supplemental information in the database corresponding to each of the actors. While viewing a video, a user may select a face of one of the actors by clicking on it, for example. The actor's biography may be presented to the user. A URL to other locations that may contain more information about the actor may be provided as well. As another example, a movie producer may have interesting facts or anecdotes about a scene, alternate scenes or outtakes, or advertising links or content. This supplemental content may also be inserted and made responsive to an appropriate cue (e.g., selection of an actor). Similarly, a consumer may utilize an implementation disclosed herein to embed URLs or supplemental content in their home videos such as identifying family members, pets, etc.

An implementation may provide a do-it-yourself tool for an original content maker to supply information and hyperlink it within the content. The content producer may embed supplemental content such as Internet links that could be triggered on a user's mobile device based on the user's location. A user's device may receive a notice that the user is proximal to a location where a scene was filmed for a movie the user recently watched. For example, a content maker may input that movie ABC was filmed in Paris, France. The information may be stored to a database. If a user's mobile device is in proximity to Paris or a more specific location in Paris where ABC was filmed, the user may receive a notice on the mobile device indicating that ABC was filmed nearby.

As another example, the filming locations for a movie may be displayed on a map that the user can interact with using navigation, for example. As another example, a user may pause a video, and select a particular piece of clothing or accessory worn by an actor in the scene or that is present as a prop (e.g., a soda can). A selection may be made by, for example, drawing a box around the area, person, or item of interest or a mouse click. The user's selection of an area, person, or item (e.g., an actor, clothing, accessory, prop, etc.) may cause a hyperlink to appear that may link the user to a webpage where the clothing, item, and/or accessory is identified and/or can be purchased. In some configurations, pictures and/or other content involving the selected entity may be presented to the user or hyperlinked. Thus, the annotations of the content may be stored to a database that may be queried in response to, for example, a user specific query or a user location. The consumption of the content may not be concurrent with the presentation of such supplemental content. For example, at a first time, a user may view a movie that includes supplemental content provided or selected by a content producer. At a second time, distinct from the first time, the user may be presented with an advertisement for an article of clothing that was in the movie the user viewed. The presentation of the article of clothing may be based on the user having viewed the movie with an actor wearing the specific clothing item and the user being in a location proximal to a store that offers the clothing item.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
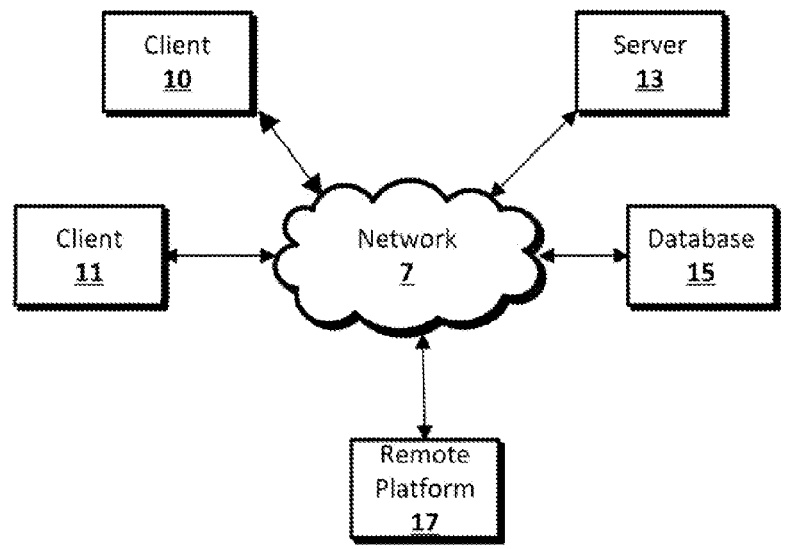
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
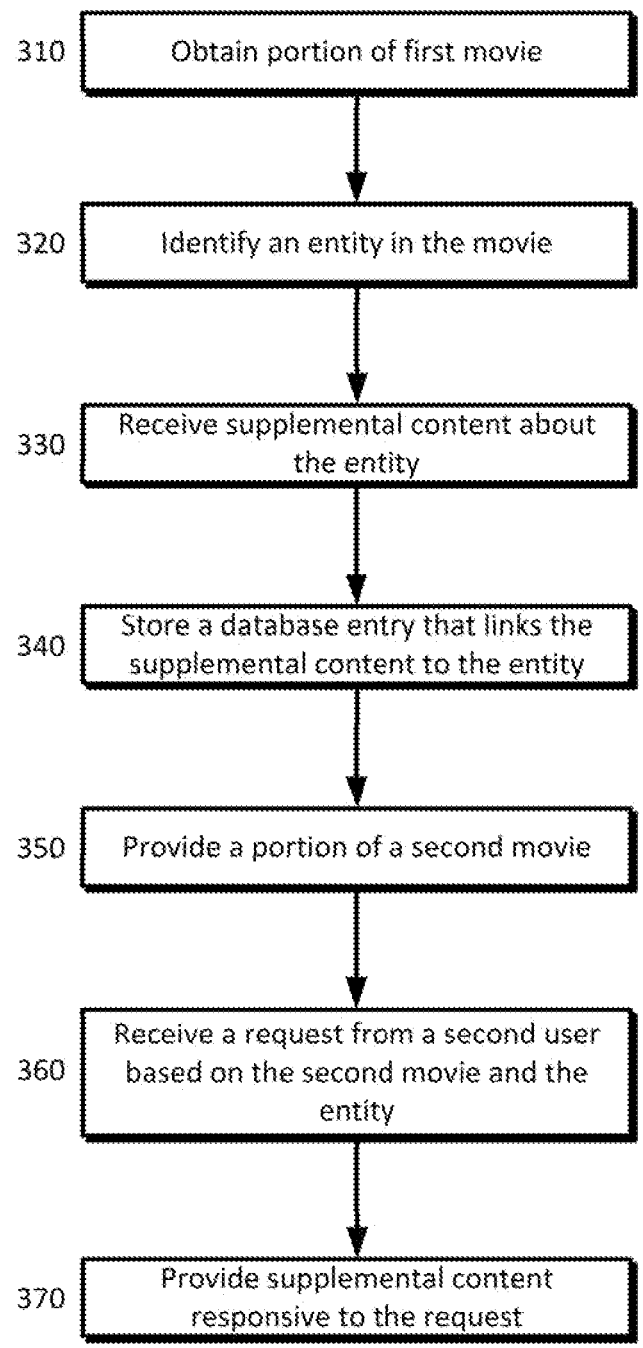
FIG. 3 shows an example process of associating an entity with supplemental content according to an implementation disclosed herein.

In an implementation, an example of which is provided in FIG. 3, a portion of a first movie may be obtained at 310. For example, an individual may upload a home movie or a movie company may provide a movie to a database. In general, a content producer may make the movie available directly (e.g., uploading to the database) or indirectly (e.g., requiring connection to a separate database via the Internet). A content producer may be an individual who determines what, if any, supplemental content may be rendered in a movie. A movie may refer to any video content including, but not limited to, a portion of a video, a user-generated video, or other multimedia content, and it may include supplemental content as disclosed herein.

An entity within the portion of the movie may be automatically identified at 320. An entity may be an audio component of the movie, a visual component of the movie, or a combination thereof. Examples of an audio component may include, without limitation: a song, a soundtrack, a voice or speech, and a sound effect. A sound effect may refer to a dog barking, a car screech, an explosion, etc. A visual component may include, for example: a scene break, a geographic location, a face, a person, an object, a physical object, a text, or a landmark. A geographic location may refer to a particular place such as Paris, an address, a landmark such as the Grand Canyon, etc. A face may be determined from a gallery in which a person has been tagged, identified, or otherwise labeled. For example, a home video application may identify faces of individuals in a video. In some instances, an individual may be identified in an online photo or other type of online publication or news article. Such sources may also be utilized to automatically identify a visual component. An example of an object that may be automatically identified is a car. The car may be identified by its make, model, manufacturer, year, etc. Faces, objects, and other entities may be identified by comparison to related galleries or other stored images that include those entities, such as where a face in a home video is identified based upon a gallery maintained by a user that includes images of a person present in the home video. Similarly, a car may be identified by comparison to a database of images of known makes and models of automobiles. A movie may contain text, for example, a subtitle, a closed caption, or on a sign in the movie. OCR may be employed to identify the text that is available in a particular scene or frame of the movie.

Automatic identification of an entity in the movie may be performed using, for example, facial recognition, speech or voice recognition, text recognition or optical character recognition, or pattern recognition such as for a song. Automatic identification of one or more entities may proceed in real time as frames of a movie are received, played, or streamed. In some configurations, the identification may be limited to a particular entity such as an actor. In some configurations, a database may be used to store features associated with various objects, persons, faces, geographic locations, etc. to which a movie that is obtained 310 may be compared to identify one or more entities. Multiple entities may be determined simultaneously in a movie. An entity may be determined on a frame-by-frame basis or based on a chapter/scene break. Information regarding an automatically identified entity may be stored in a database and be linked to a time reference or other references to the movie. The database containing the stored entity may receive queries regarding the automatically identified entity. For example, a song may be identified as being present from one time reference to another or in a particular chapter or scene of a movie. Thus, automatic identification of an entity may include, without limitation, automatically recognizing: faces, objects (e.g., cars, airplanes, bikes, etc.), geographic locations, logos, gender, age, characteristics of an individual (e.g., whether a person is smiling or frowning), animals, speech, printed text, scene breaks in a movie, object tracking, speech recognition, or a song/music (e.g., audio recognition). Object tracking may refer to detecting an object over two or more time reference points. For example, a soda can may be detected in a first scene and the same soda can may be detected throughout the first scene and/or when the soda can again appears in a second scene, which may or may not chronologically follow the first scene.

Supplemental content may be received from a first user, such as a content producer, about the identified entity within the first movie or selected from an automatically identified entity by the first user at 330. Supplemental content may refer to, for example: a text, an audio entity, a visual entity, a URL, a picture, an advertisement, and a location. For example, an actor may have been automatically identified as part of the process referred to earlier at 320. A content producer, director, or the like may select the identified actor and provide an anecdotal story that occurred during filming that involved the actor. Subsequently, the anecdote may appear when a user selects the actor, such as while the user is viewing the movie, or when the user performs a web-based query related to the actor or the movie. The anecdote and/or the identified actor may be supplemental content as disclosed herein. As another example, a picture may be provided that conveys a behind-the-scenes shot of a particular moment in a movie. When the movie is viewed by a user, the picture may be provided to the user at a time when the user is viewing the associated moment in the movie, and/or in response to a request from the user for supplemental content associated with that moment or with the movie generally.

The first user may elect to have a subset of all automatically identified content displayed to a user upon a particular action from the user, such as pausing the movie, or selecting an area or point of the screen to indicate a desire to select an entity such as an actor, an article of clothing a prop, an item, or the like. A movie may contain different subsets of supplemental content that are presented to a user at different time reference points. For example, a content producer may elect to have actors identified when a user pauses the movie at a first time reference that corresponds to a first scene. At a second time corresponding to a second scene, but where the second scene contains entities that overlap with those in the first scene reference, the content producer may have only information about inanimate objects presented at this time. An automatically identified entity may have different supplemental content provided and/or associated with it at different time references as well. For example, at a first time reference, the content producer may include, as supplemental content, an anecdote that appears if the user selects an actor. At a second time reference, the content producer may include other supplemental content such as a hyperlink to the clothing and/or accessories worn by the actor presented to the user, or the user may be directly linked to a webpage where such clothing and/or accessories can be viewed and/or purchased. More generally, the content producer may select some of the automatically identified content as supplemental content as disclosed herein, and/or may provide additional information in association with automatically identified content as supplemental content.

In some configurations, a time reference may be associated with the supplemental content. For example, the anecdote described in an earlier example may be associated with the particular actor or the duration of the scene to which it pertains. A database entry may be stored that links the identified entity within the portion of the first movie and the supplemental content about the identified entity at 340. The database entry may be queried independent of viewing of the movie. Continuing the example, if a person searches the name of the actor for whom the director conveyed an anecdote, the anecdote may appear in the search results and be associated with the movie and/or a time reference. The database entry may be based upon an identification of the portion of the movie, the supplemental content, and the identified entity to a database.

For any of the implementations disclosed herein, entity identification may not be limited to a particular time reference. For example, facial recognition may identify the face of an actor wearing a blue shirt in a first scene as the same actor in a second scene in which the actor is wearing a gray coat. If a content maker inputs the actor's name, the actor will be so identified in both the first scene and the second scene. Thus, information received for an identified entity may be associated with the entity in any and/or all instances of the entity within the movie or video.

In some instances, an entity may not be identified. For example, the identity of an "extra" in a big-screen movie production may not be known. A content producer or user may indicate the identity of the entity. In some configurations, when a user identifies an entity, it may be vetted by the content producer or by a group moderated process where multiple users confirm, reject, or suggest an alternative identity for the identification provided. In some instances, supplemental content may be provided independent of the movie itself. For example, the first movie may contain a scene involving a particular bar in Boston. A user may visit the bar where the scene was shot and link a picture of the exterior/interior of the bar to the scene in the movie or the movie itself. Thus, over time, a database may accumulate information from users or content and the identified entities of one or more movies.

A portion of a second movie may be provided to a second user, which includes the identified entity and/or supplemental content at 350. For example, a second user may elect to watch a second movie that contains an actor who was identified in the first movie and/or had some supplemental content associated with the actor or scene. In some instances, the first movie and the second movie may be the same. For example, the second user may watch the first movie. Similarly, the anecdote and/or other supplemental content may be provided to a user that views another movie or other media in which an entity is identified and for which supplemental content is received. For example, if the example anecdote relates to an actor, the anecdote may be provided to a user who views a second, different movie in which the actor appears.

A request from the second user may be received based upon the portion of the second movie and the identified entity at 360. For example, a user may select an object in the scene of the second movie by clicking on the object, pausing the movie, drawing a box around an area of the movie either while it is playing or while it is paused, inputting text such as an actor's name or a chapter/scene number, or speaking a name or other voice command. A processor connected to the database that stored the entry may receive the query. In some instances, the database may be linked to a server that receives the query and subsequently queries the database.

In some configurations, the entity may be tracked in the movie throughout the duration of time that the entity exists within the portion of the movie. For example, an actor's or object's position in a scene may be communicated to a database as a series of coordinates along with information to indicate the actor's name or the object's identity, such as a soda can, and a time reference or time index. The actor or object may be identified for a portion of the movie such as a scene or for the entirety of the movie. In the example where coordinates are relayed to convey the position or dimension of the actor or object in a portion of the movie, the receipt of a user query on a particular image frame of a movie or during playback of the movie may be compared to the stored coordinates and time index or reference to identify the object being queried.

In some instances, a user may draw a box to make a selection of people and/or objects. For example, a scene may involve four individuals, each with an object in hand. A user may draw a circle around each actor that encompasses the object each actor possesses. In some configurations, the system may assume that the user intends to have it track the actors or objects alone. In other instances, a window for each selected object may appear and provide supplemental content that is available, if any, for the object. In some configurations, the user may receive an indication that multiple actors, objects, etc. have been selected and the user may select the actors, objects, etc. that the user would like to have queried or tracked or for which the user would like supplemental content presented. For example, the user may be presented with a selectable list of the actors, objects, etc.

Automatically identified entities may include audio or visual information that is not directly selectable by an input device such as a mouse. For example, a user may be interested in a song that is being played during a particular scene. The user may, for example, pause the movie and a sound icon may appear which, when clicked, may display the song currently being played. As another example, the user may type the word "song" using a keyboard and the title of the song may appear. The user may click on the title of the song to reveal additional supplemental content such as a link to the movie soundtrack. Similar features may be used with other entities that may not be directly-selectable, such as a chapter number, scene name, etc.

Responsive to the request from the second user, the supplemental content may be provided to the second user at 370. For example, a user may click on an actor's face in the movie. The movie may pause and information about other movies the actor has been involved with, the latest news regarding the actor, upcoming movies in which the actor will appear, the actor's personal webpage or comment feed, and/or other supplemental content may also be displayed. Supplemental content may be presented in the form of a URL. For example, if the user selects the comment feed, it may link the user to an application or webpage external to the movie-providing application or webpage.

Figure 4:
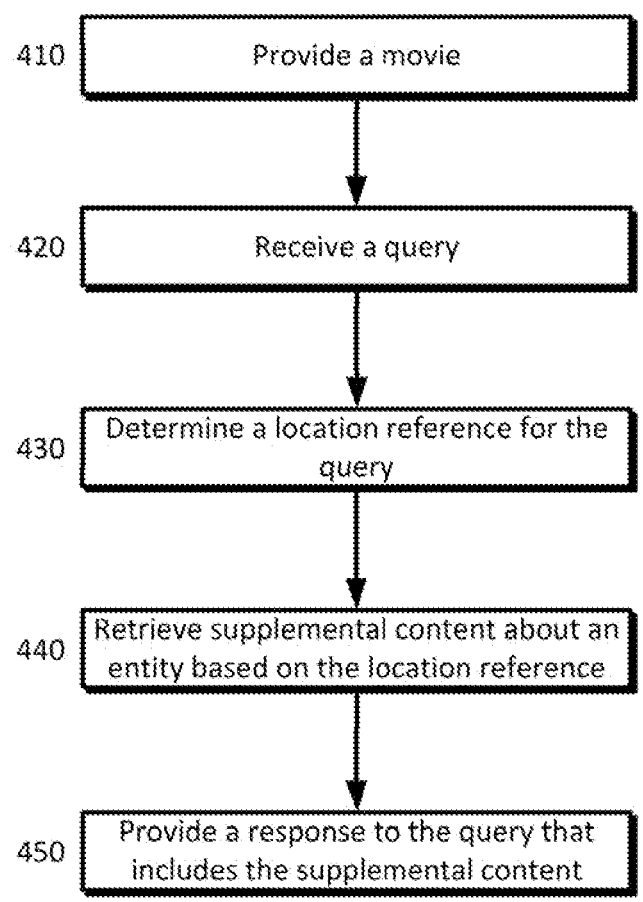
FIG. 4 shows an example process of providing supplemental content with an identified entity according to an implementation disclosed herein.

An example of an implementation is provided in FIG. 4. A movie may be provided at 410 by, for example, a streaming service, an application, or a stand-alone player. A query may be received from a user at 420. The query may be received by an input method during playback of the movie. An input method may refer to use of an input device such as a keyboard or a mouse, a touch-interaction, a gesture, or a voice command. For example, a user may speak an actor's name or a chapter/scene number. A location reference that identifies an entity for the query may be determined at 430. The location reference may identify an entity in the movie and it may refer to a particular location of the entity with a frame or sequence of frames of the movie (e.g., the area occupied by the entity, the time during which the entity appears, etc.). As described earlier, the query may be associated with a time reference and coordinates. The time reference and coordinates may be used to query a database for automatically identified entities and/or supplemental content. Thus, a user may obtain the identity of one or more selected or located automatically identified entities by speaking the query, selecting an area or point on a display, and/or making a gesture to an area of the display. Gesture recognition, voice recognition, and conventional mechanisms of selecting an entity or querying a database may be utilized with any implementation disclosed herein.

In some configurations, the supplemental content about the identified entity may be retrieved from the database at 440. The database may include one or more automatically identified entities for a one or more movies and supplemental content. A response to the query that includes supplemental content may be provided to the user at 450. In some instances, the supplemental content may be provided substantially near the location of the reference. For example, if the query is provided by a mouse click to an actor's face, the supplemental content regarding that particular actor may be provided adjacent to the actors face. The system may track the actor throughout the scene and during that time, the supplemental content may continue to be displayed adjacent to the actor's face.

Figure 5:
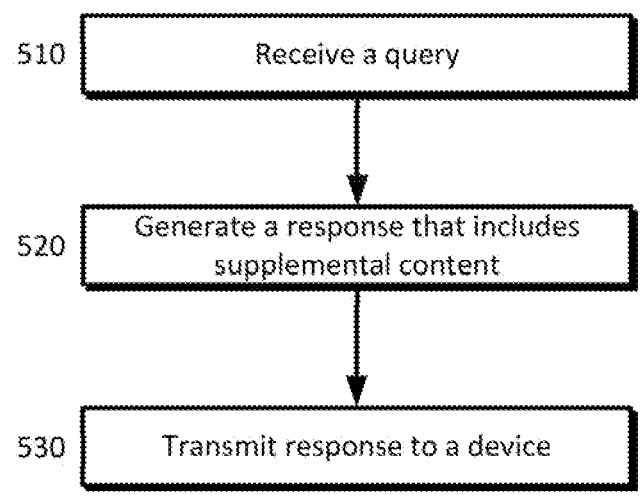
FIG. 5 is an example process of generating a response to a query as disclosed herein.

An example of an implementation is provided in FIG. 5. A query may be received by a database at 510. The database may contain entries corresponding to one or more automatically identified entities for one or more movies and supplemental content. A response may be generated that includes supplemental content based on at least user history and/or user location at 520. In some instances, a user history may include content consumed by a user (e.g., a song that was purchased, a movie that was viewed) and in some instances, the user history may include content for which the user has indicated an interest (e.g., a book that is in purchase queue). The response may be sent to a device such as a mobile phone, a smartphone, a laptop, or any other computing device at 530.

For example, a user history may indicate that a user viewed movie Yankee that was filmed at restaurant Zulu. The user may submit a web query on a mobile device for restaurants near the user's location. The query may be received by a processor connected to the database. The user's location may be used to identify and generate a list of restaurants near the user, which is then cross-referenced against the user's history to further narrow the list. For example, Zulu may be suggested to the user and be presented with supplemental content indicating that Yankee, a movie the user has seen or may be interested in seeing, was filmed at Zulu. Additional information may be obtained from the user or other sources that provides additional relevant information, such as a user preference. For example, it may be determined based upon a user response or other profile information available about the user, that the user may be a vegetarian. Restaurants that lack a well-received vegetarian menu or option may be excluded from the response or from a list generated by querying a database. In some instances, such a query may be automatically sent by the device.

In some configurations, an augmented reality may be provided to the device. For example, a user visiting the Grand Canyon on a vacation may receive a notice that includes supplemental content related to the Grand Canyon. For example, based on a user history or a user preference, it may be determined that the user is interested in a particular topic, and/or movie/music genre. Information may be provided to the user related to the user's interest. For example, the user may be a history aficionado as determined by the user's voluminous collection of historical documentaries. The user may receive a notice containing lesser-known interesting historical facts about the Grand Canyon, or about a particular location or feature at the Grand Canyon that is close to the user's location. In some configurations, the user may be able to augment the reality viewed by viewing a location, such as the Grand Canyon, using an electronic device such as a camera connected to a mobile phone. The Grand Canyon may be shown on the display of the device with one or more selectable markers. If the user selects a marker, the user may be provided supplemental content. For example, if the South Rim is on the display and the user selects a marker on the South Rim, the user may be provided facts about the Grand Canyon Railway. A display may be augmented without the use of a selectable marker. For example, the user may touch the South Rim on the display to have supplemental content provided. If markers are provided on the display, they may adapt as the user moves or pans the device around an area. The user may also receive a recommendation or suggestion of content related to the Grand Canyon. For example, a documentary that the user has not seen, possibly one related to the Grand Canyon Railway, may be suggested to the user for purchase or download. Thus, a user's location, a user's history, and/or supplemental content may be used to augment the reality of the user.

In some configurations, an update to the supplemental content from the device may be received, for example, by a processor connected to a database. For example, a fire may have destroyed a building where movie was filmed. A user may take a picture of the burned-out building and upload it to the particular movie scene containing the building. The picture may be tagged with other information such as a link to a news story about the fire, the date, the author of the picture, etc. Subsequent to the upload of the picture, other users who receive the supplemental content for that particular movie may be presented with the picture.

In an implementation, supplemental content may be received and it may be stored, for example, to a computer readable medium. Content such as a movie or song may be obtained. An entity in the content may be automatically identified and/or tracked in the content throughout the duration that the entity exists within the content as disclosed herein. The tracking may be a dynamic process, for example, that determines the presence of the entity and may relay coordinates of the entity on the display or a time reference or a scene or chapter number. A portion of the supplemental content may be retrieved based on the automatically identified entity as disclosed herein, such as from a database entry that links the identified entity with a portion of the supplemental content while the entity is present in the content. A link, for example, may refer to a table containing at least the identified entity and the portion of the supplemental content. A portion of the content that includes the identified entity may be provided to a user as disclosed herein. A request from the user based upon the portion of the movie and the identified entity may be received, in response to which the supplemental content may be provided to the user as previously described.

Figure 6:
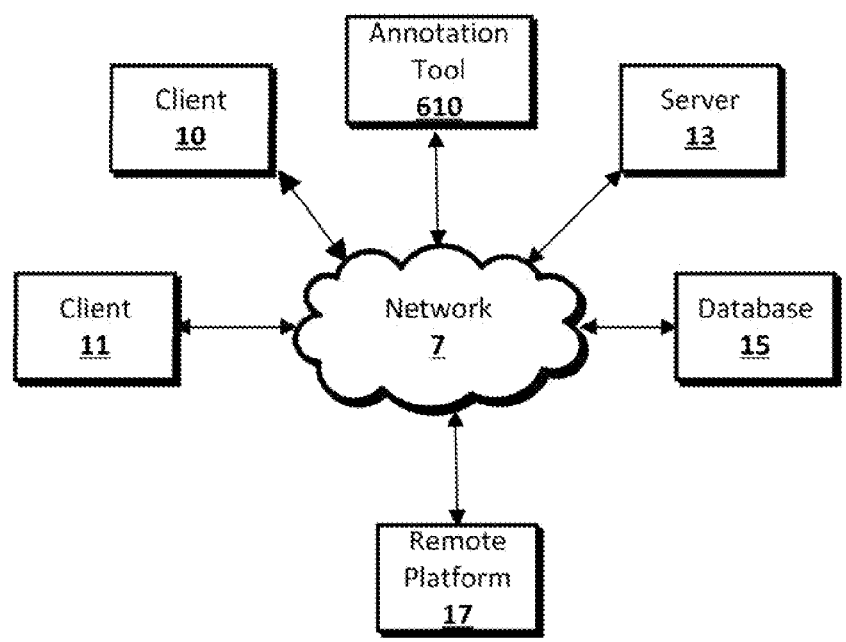
FIG. 6 shows an example arrangement of devices according to an implementation disclosed herein.

A content annotation tool as disclosed herein may be provided, for example, via a hosted, cloud-based, or other remote system, such as a hosted system that provides media content to a user via a web browser or similar interface. Alternatively or in addition, a tool as disclosed herein may be provided by way of a local computer that implements the functionality disclosed herein, which may communicate with a remote system to provide and/or obtain supplemental content as disclosed. In some configurations, a remote system may provide multiple users with access to movies and other media, and may then aggregate various supplemental content provided by the multiple users as disclosed. The annotation tool may be integrated with a database which stores supplemental content as described, or it may be provided by a separate computer system that is in communication with one or more databases that store and provide media and/or supplemental content. An example of the annotation tool is provided in FIG. 6. The annotation tool 610 may be connected to one or more databases 15 via a network 7, which may store the various media, supplemental content, and other data disclosed herein. In some configurations, the annotation tool 610 may be virtualized and provided to clients 10, 11 via the network 7. Clients 10, 11 may provide content stored on the client 10, 11 computing device and/or the database 15 as disclosed herein.

In an implementation, a portion of a first movie may be obtained. As described earlier, a movie may be any video content provided from any source (e.g., home user, movie company, film director, professional or amateur director, etc.). One or more entities within the portion of the movie may be automatically identified as described above. In some instances, an entity may be manually input by, for example, a source provider or end users. Supplemental content may be received from a first user about one or more of the automatically identified entities within the first portion of the movie. The supplemental content may include a selection of one or more of the automatically identified entities, and/or additional content provided by a user. A database entry may be stored and/or generated that links the identified entity within the portion of the first movie and the supplemental content about the identified entity. For example, a selection of one or more automatically identified entities may be received. Supplemental content may be received and/or associated with the selected one or more entities. In some instances, the supplemental content and/or automatically identified entities may be associated with a time reference.

In situations in which the systems discussed here collect personal information about users, or may make use of personal information, the users may be provided with an opportunity to control whether programs or features collect user information (e.g., information about a user's social network, social actions or activities, prior media views or purchases, profession, a user's preferences, or a user's current location), or to control whether and/or how to receive content from systems disclosed herein that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by systems disclosed herein.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
   obtaining a portion of a movie;
   automatically identifying an entity within the portion of the movie using a technique selected from the group consisting of: face recognition, voice recognition, object recognition, individual characteristic recognition, scene break recognition, object tracking, speech recognition, and audio recognition;
   receiving supplemental content from a first user about the identified entity within the first movie;
   subsequent to receipt of the supplemental content, receiving an update to the supplemental content about the identified entity within the movie, wherein the update to the supplemental content modifies or replaces the supplemental content;
   receiving a request from a second user for information related to a location of the second user; and
   responsive to the request, providing, to the second user, the information related to the location and at least one item of the supplemental content, from the update to the supplemental content, related to the location.

2. The method of claim 1, further comprising storing a database entry that links the identified entity within the portion of the movie and the supplemental content about the identified entity wherein the database entry is based upon an identification of the portion of the movie, the supplemental content, and the identified entity to a database.

3. The method of claim 1, further comprising tracking the entity in the movie throughout a duration that the entity exists within the portion of the movie.

4. The method of claim 1, wherein the entity comprises an audio component of the movie.

5. The method of claim 4, wherein the audio component is selected from the group consisting of: a song, a soundtrack, a voice, and a sound effect.

6. The method of claim 1, wherein the entity comprises a visual component.

7. The method of claim 6, wherein the visual component is selected from the group consisting of: a scene break, a geographic location, a face, a person, an object, a physical object, and a text.

8. The method of claim 1, wherein the supplemental content is selected from the group consisting of: a text, an audio entity, a visual entity, a URL, a picture, an advertisement, and a location.

9. The method of claim 1, further comprising associating a time reference with the supplemental content.

10. The method of claim 1, wherein the supplemental content comprises a selection of one or more of the automatically identified entities.

11. A computer-implemented method comprising:
automatically identifying an entity in a movie using a technique selected from the group consisting of: face recognition, voice recognition, object recognition, individual characteristic recognition, scene break recognition, object tracking, speech recognition, and audio recognition;
obtaining supplemental content for the entity identified in the movie;
subsequently, receiving an update to the supplemental content for the identified entity in the movie, wherein the update to the supplemental content modifies or replaces the supplemental content;
providing the movie;
receiving, from a user, a query for information related to a location of the user, wherein the query is received by an input method during playback of the movie;
retrieving, from a database, the information related to the location and at least one item of the supplemental content, of the update to the supplemental content about the identified entity, related to the location, wherein the database comprises a plurality of automatically identified entities for a plurality of movies and corresponding supplemental content; and
providing, to the user, a response to the query wherein the response includes the update to the supplemental content.

12. The method of claim 11 further comprising tracking the entity while the entity is present in the content.

13. The method of claim 11, wherein the query is received by an input device.

14. The method of claim 11, wherein receipt of the query causes playback of the content to pause.

15. A computer-implemented method comprising:
receiving supplemental content;
storing the supplemental content;
obtaining content;
automatically identifying an entity in the content using a technique selected from the group consisting of: face recognition, voice recognition, object recognition, individual characteristic recognition, scene break recognition, object tracking, speech recognition, and audio recognition;
subsequent to receipt of the supplemental content, receiving an update to the supplemental content about the identified entity within the content, wherein the update to the supplemental content modifies or replaces the supplemental content;
retrieving a portion of the update to the supplemental content based on the entity;
storing a database entry that links the identified entity with the portion of the update to the supplemental content while the entity is present in the content;
providing, to a user, a portion of the content, the portion of the content including the identified entity;
receiving, from the user, a request for information related to a location of the user and based upon the portion of the content and the identified entity; and
responsive to the request, providing, to the user, the information related to the location and at least one item of the supplemental content, of the update to the supplemental content, related to the location.

16. The method of claim 15, wherein the supplemental content is selected from the group consisting of: a text, an audio entity, a visual entity, a URL, a picture, an advertisement, and a location.

17. The method of claim 15, wherein the content comprises a movie or multimedia data.

18. The method of claim 15, wherein entity comprises an audio component of the content.

19. The method of claim 17, wherein the audio component is selected from the group consisting of: a song, a soundtrack, a voice, and a sound effect.

20. The method of claim 15, wherein the entity comprises a visual component.

21. The method of claim 19, wherein the visual component is selected from the group consisting of: a scene break, a geographic location, a face, a person, an object, a physical object, and a text.

22. The method of claim 15, further comprising associating a time reference with the supplemental content.

23. The method of claim 15, further comprising tracking the entity in the content throughout a duration that the entity exists within the content.

* * * * *